May 13, 1952     H. R. MOULTON ET AL     2,596,863

ADHESIVE COMPOSITION FOR LAMINATING OPTICAL ELEMENTS

Filed Aug. 30, 1949

INVENTORS
HAROLD R. MOULTON
JOSEPH MAHLER
BY
Louis L. Vagnon
ATTORNEY

Patented May 13, 1952

2,596,863

UNITED STATES PATENT OFFICE 2,596,863

ADHESIVE COMPOSITION FOR LAMINATING OPTICAL ELEMENTS

Harold R. Moulton, Southbridge, and Joseph Mahler, Brookline, Mass., assignors to American Optical Company, Southbridge, Mass., a voluntary association of Massachusetts Application August 30, 1949, Serial No. 113,164

9 Claims. (Cl. 260—27)

This invention relates to improvements in laminated lenses and has particular reference to lenses formed of laminations of transparent materials and the adhesive used for cementing said laminations and methods of making same.

One of the principal objects of this invention is to provide a laminated lens embodying superimposed layers of transparent materials having a layer of cementitious material therebetween for satisfactorily bonding the layers and securely retaining them from separation or relative movement.

Another object is to provide a lens formed of superimposed layers of glass having a polarizing film therebetween, with said glass layers and polarizing film being cemented together and united into an inseparable body capable of subsequently being efficiently shaped as by edging to a desired contour shape and/or providing with surface curvatures, with satisfactory results.

Another object is to provide a laminated lens of the above character having ultra-violet absorption characteristics provided by the cementitious material used in bonding the laminations together.

Another object is the provision for use in lenses of the above character of an improved adhesive which is substantially colorless, highly transparent and stable, and which readily bonds to both glass and polarizing films, and relatively permanently retain said bond.

Another object is the provision of an adhesive of the above character which is capable of being made and used at normal temperatures and pressures, and which efficiently unites the lens laminations without presence of air bubbles or edge air pockets.

Another object is the provision of a cement of the above character having an index of refraction substantially the same as the glass surfaces being cemented, and which possesses extreme toughness to resist shocks, temperature changes, and bending and breaking strains.

Another object is to provide a cement of the above nature having characteristics whereby a laminated lens using said cement will possess ultra-violet absorption.

Still another object is to provide a cement of the above character which is formed as a mixture containing controlled amounts of chlorinated paraffin wax, rosin, phenyl salicylate and polyethylene glycol dimethacrylate.

Other objects and advantages will become apparent from the following description taken in connection with the accompanying drawing in which.

Figure 1:
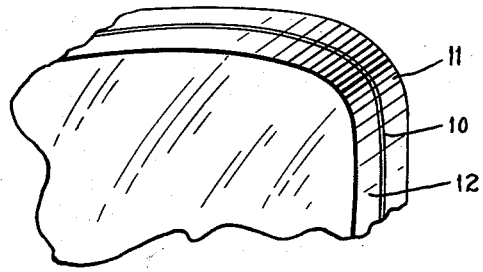
Fig. 1 is a fragmentary perspective view of an ordinary lens embodying the invention.
Figure 2:
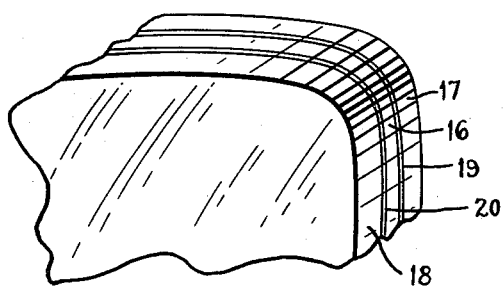
Fig. 2 is a fragmentary perspective view of a polarizing lens embodying the invention.

In the past when manufacturing lenses embodying laminations of glass or glass and plastic materials, it has been common practice to use various adhesives for cementing the parts of the lenses together. This is done, for example, when providing ophthalmic lenses with bifocal segments or when forming polarizing lenses by inserting a polarizing film between laminations of glass or other similar transparent material.

Thermoplastics, such as methyl methacrylate, cydohexyl methacrylate, etc. have been employed for this purpose by being polymerized in situ, but are generally unsatisfactory because of the requirement of long curing times at controlled temperatures and under controlled atmospheric conditions; also because of the tendency of the parts of the lenses to become easily parted due to poor bonding thereof, and further because of the marked shrinkage of the cement as it is cured, causing bubbles to form between the laminations and air pockets to form at the edges of the lenses. Thermosetting cements, such as diallyl diglycol dicarbonate have the same drawbacks.

Thermoplastic resin compositions, such as plasticized polyvinyl butyral polymers also commonly used as cements, are generally unsatisfactory due to the fact that their bonding action is not of a permanent nature and such cements have indices of refraction substantially different from the glass generally used in forming lenses; also because of the fact that such cements are rather birefringent causing rotation of the polarization axis, they are not generally satisfactory for use in making polarizing lenses.

The present invention overcomes these objections by providing an improved substantially colorless cement of a permanent stable nature which can be made and cured at normal temperatures in short periods of time and in normal atmospheres, and which will not shrink, provides an excellent bond, has an index of refraction substantially the same as glass used in forming such laminations, and is not of a birefringent nature.

In making a cement in accordance with this invention, rosin in the desired amount is initially melted to a thick viscous liquid state. The rosin may be the usual light colored rosin of commerce and serves as an ingredient in the final cement for reducing shrinkage and providing exceptionally good bonding between glass and plastic materials such as polarizing film. To this liquid rosin is added the desired amount of chlorinated paraffin wax and the desired amount of phenyl salicylate crystals. The chlorinated paraffin wax preferably has a chlorine content falling within the range of 40 to 42% by weight, and the phenyl salicylate crystals, which are sold under the trade name "Salol," are used to impart ultra-violet absorption characteristics to the resultant cement whereby there is provided ultra-violet transmission of approximately 5% at 350 millimicrons in the spectrum and less at shorter wavelengths. These ingredients are thoroughly mixed, the phenyl salicylate crystals becoming melted, and the mixture is then allowed to cool to room temperature. Subsequently, a thermosetting resin, preferably polyethylene glycol dimethacrylate, is added in desired amounts to the cooled mixture and the entire composition thoroughly mixed. At this stage, the mixture may be stored for indefinite periods of time, if desired.

Prior to the time of using the above mixture as a cement, it is necessary to add thereto amounts of a catalyst such as tertiary-butyl hydroperoxide, benzoyl peroxide or Uniperox 60, in amounts of substantially 1 to 3% of the cement mixture.

It is to be understood that when forming this cement composition, all stirring and mixing should be done gently so as to prevent formation of air bubbles.

Figure 4:
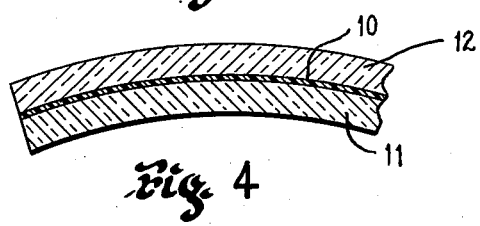
Figs. 4 and 5 are sectional views of the lenses shown in Figs. 1 and 2 respectively.
Figure 5:
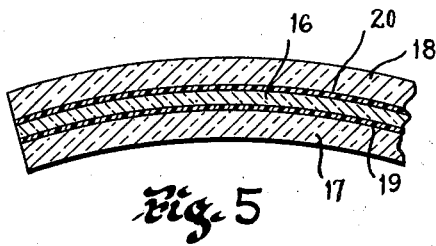

After the catalyst has been introduced to start reaction of the ingredients with one another, the cement is ready for use such as by providing a layer of the cement 10 between superimposed layers of glass or other known suitable transparent material 11 and 12 in forming a laminated ophthalmic lens such as is shown in Figs. 1 and 4 of the drawing wherein like characters of reference designate like parts throughout the several views.

The lens produced in accordance with the foregoing is then heated until cured, which heating cycle will preferably be for approximately thirty minutes at about 100° C.

Figure 3:
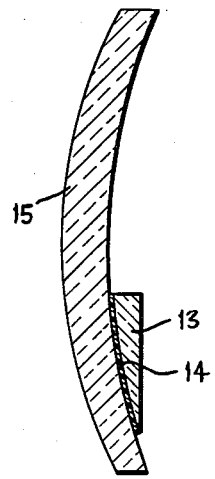
Fig. 3 is a sectional view of a lens having a bifocal segment thereon.

A bifocal segment 13 (Fig. 3) can also be attached by a layer 14 of the cement to a surface of a lens blank 15. Polarizing lenses can be made by providing a polarizing film 16 which has been previously formed and provided with the desired polarizing characteristics, with layers of glass or other known suitable transparent materials 17 and 18 attached to the respective side surfaces thereof by layers 19 and 20 respectively of the cement.

It will be understood that such lenses, when formed as laminations bonded by this cement, will possess all the aforementioned improvements over prior art laminated lenses formed by using known thermoplastic or thermosetting resin cement compositions.

Table A which follows is a formula for producing the preferred cement compositions:

Table A

| Ingredient | Per cent |
| --- | --- |
| Rosin | 13.2 |
| Chlorinated paraffin wax | 39.5 |
| Phenyl salicylate | 7.8 |
| Polyethylene glycol dimethacrylate | 39.5 |
| | 100 |

The formula in Table A produces the preferred cement but it is to be understood that the proportions of the various ingredients can be varied somewhat with the resultant cements still being of a satisfactory nature. This is indicated in Table B wherein ranges of proportions of the ingredients are given.

Table B

| Ingredient | Per cent |
| --- | --- |
| Rosin | 10-20 |
| Chlorinated paraffin wax | 20-50 |
| Phenyl salicylate | 5-10 |
| Polyethylene glycol dimethacrylate | 20-60 |

Other specific formulae producing satisfactory cements in accordance with this invention are:

Table C

| Ingredient | Per cent |
| --- | --- |
| Rosin | 13.2 |
| Chlorinated paraffin wax | 49 |
| Phenyl salicylate | 7.8 |
| Polyethylene glycol dimethacrylate | 30 |
| | 100 |

Table D

| Ingredient | Per cent |
| --- | --- |
| Rosin | 13.2 |
| Chlorinated paraffin wax | 30 |
| Phenyl salicylate | 7.8 |
| Polyethylene gylcol dimethacrylate | 49 |
| | 100 |

Table E

| Ingredient | Per cent |
| --- | --- |
| Rosin | 19.2 |
| Chlorinated paraffin wax | 24 |
| Phenyl salicylate | 7.8 |
| Polyethylene gylcol dimethacrylate | 49 |
| | 100 |

In each case, a small percentage of catalyst of the amounts and types mentioned herein is added to promote curing, just before use.

From the foregoing, it will be seen that there is produced an improved cement in accordance with all of the objects and advantages of this invention which can be used in producing improved laminated lenses and the like formed of either layers of glass, plastics, or glass and plastic materials.

While certain novel features of the invention have been shown and described and are pointed out in the annexed claims, it will be understood that various omissions, substitutions and changes in the forms and details of the means and methods illustrated and described and in the formulae recited may be made by those skilled in the art without departing from the spirit of the invention.

Having described our invention, we claim:

1. A cement formed of a mixture of rosin, chlorinated paraffin wax, phenyl salicylate and polyethylene glycol dimethacrylate.

2. A cement comprising approximately from 10 to 20% of rosin, approximately from 20 to 50% of chlorinated paraffin wax, approximately from 5 to 10% of phenyl salicylate, and approximately from 20 to 60% of polyethylene glycol dimethacrylate.

3. A highly transparent, stable cement for joining transparent optical elements consisting of approximately 13.2% of rosin, approximately 39.5% of chlorinated paraffin wax, approximately 7.8% of phenyl salicylate, and approximately 39.5% of polyethylene glycol dimethacrylate.

4. A highly transparent, stable cement for joining transparent optical elements consisting of approximately 13.2% of rosin, approximately 49% of chlorinated paraffin wax, approximately 7.8% of phenyl salicylate, and approximately 30% of polyethylene glycol dimethacrylate.

5. A highly transparent, stable cement for joining transparent optical elements consisting of approximately 13.2% of rosin, approximately 30% of chlorinated paraffin wax, approximately 7.8% of phenyl salicylate, and approximately 49% of poylethylene gylcol dimethacrylate.

6. A highly transparent, stable cement for joining transparent optical elements consisting of approximately 19.2% of rosin, approximately 49% of chlorinated paraffin wax, approximately 7.8% of phenyl salicylate, and approximately 24% of poylethylene gylcol dimethacrylate.

7. The method of forming a highly transparent cement for use in joining transparent elements comprising melting a controlled amount of rosin, adding thereto controlled amounts of chlorinated paraffin wax and phenyl salicylate, cooling this mixture, adding thereto a controlled amount of polyethylene glycol dimethacrylate, and subsequently adding a catalyst for causing a reaction of said ingredients.

8. The method of forming a highly transparent cement for use in joining optical elements comprising melting an amount of rosin equal to from approximately 10 to 20% of the total cement mixture, adding thereto approximately from 20 to 50% of chlorinated paraffin wax and approximately from 5 to 10% of phenyl salicylate, cooling, then adding thereto from approximately 20 to 60% of polyethylene gylcol dimethacrylate and subsequently adding a catalyst for causing a reaction of said ingredients.

9. The method of forming a highly transparent cement for use in joining optical elements comprising melting an amount of rosin equal to approximately 13.2% of the total cement mixture, adding thereto approximately 39.5% of chlorinated paraffin wax, and approximately 7.8% of phenyl salicylate, cooling, then adding thereto approximately 39.5% of polyethylene gylcol dimethacrylate and subsequently adding a catalyst for causing a reaction of said ingredients.

HAROLD R. MOULTON.
JOSEPH MAHLER.

REFERENCES CITED

The following references are of record in the file of this patent:

UNITED STATES PATENTS

| Number | Name | Date |
|---|---|---|
| Re. 21,904 | Land | Sept. 23, 1941 |
| 1,948,636 | Tillyer | Feb. 27, 1934 |
| 2,211,689 | Dittmar | Aug. 13, 1940 |
| 2,255,313 | Ellis | Sept. 9, 1941 |
| 2,263,249 | Rogers | Nov. 18, 1941 |
| 2,320,375 | Moulton | June 1, 1943 |
| 2,443,736 | Kropa | June 22, 1948 |
| 2,445,536 | Parsons | July 20, 1948 |
| 2,453,665 | Kropa | Nov. 9, 1948 |
| 2,527,400 | Cooper | Oct. 24, 1950 |